Patented Mar. 17, 1953

2,631,960

UNITED STATES PATENT OFFICE 2,631,960

METHODS OF SURFACING WOOD AND SIMILAR MATERIALS WITH COPOLYMERIZABLE MIXTURES

Edwin H. Dafter, Jr., Washington, D. C., assignor to American Cyanamid Company, New York, N. Y., a corporation of Maine No Drawing. Application March 21, 1951, Serial No. 216,854

12 Claims. (Cl. 154—121)

This invention relates to a method of surfacing articles with particular synthetic resin compositions. More particularly, it relates to a method of surfacing articles in the nature of plywood and pressed board with a composition comprising a solid copolymer which is prepared by the copolymerization of a copolymerizable mixture containing an unsaturated alkyd resin and a material having a $CH_2=C<$ grouping which is copolymerizable therewith.

It has long been a desired objective of prior art inventors to find a means of surfacing objects with the above-described compositions for the reason that these particular compositions in the cured state have almost every desirable attribute of a surface coating material. Properly cured copolymers of this class are resistant to attack by almost every type of chemical and solvent and they are relatively abrasion resistant and dimensionally stable. In addition, the unpolymerized mixtures are one hundred percent reactive and the costly and wasteful use of a solvent could thereby be avoided if a practical method of surfacing with these compositions could be found.

The first prior art attempt to use these compositions as a surface coating consisted in the conventional method of spraying or brushing the catalyzed mixture upon an article and then curing with heat in the presence of air. This method was not entirely successful for the reason that it was difficult for the resins to achieve a completely tack-free surface in the presence of air. Even when driers such as cobalt and lead naphthenate were used, the copolymer, although becoming tack-free, frequently possessed a surface layer which was not completely cured and which might be attacked by common solvents.

Other prior art methods included curing the copolymerizable mixture while covered with a protective sheet such as cellophane or a polished metal caul to prevent contact of the mixture with the air. This required, at a minimum, a slight degree of pressure in order to assure complete contact between the copolymerizable mixture and its cover. The results of this method were that said mixture decreased in viscosity under heat and flowed away from the article to be surfaced under the pressure. The resultant coating was, therefore, extremely thin and had very poor appearance. The protection afforded the article by such a coating was less than generally desired.

The difficulties encountered in these attempts in the prior art led to still other methods of surfacing with this class of resins. In general, these subsequent methods had one fundamental concept. This concept was that if the copolymerizable mixture were gelled prior to the pressing operation, the gel structure would retain some residual flow but would still be firm enough to resist flow under pressure to such an extent that a coating having both depth and beauty could be obtained. In one such method an assembly is made by placing a layer of copolymerizable, catalyzed mixture upon a polished steel plate. This assembly was then heated until the mixture gelled. Upon pressing the assembly against an object such as plywood and subjecting it to heat, the gelled mixture sometimes had precisely the proper amount of residual flow and an excellent coating was obtained. Such coatings were exactly the type desired and possessed all the desirable attributes of the copolymer. The primary difficulty with this method was that the degree of gelation of the resin was extremely critical. If the gelation proceeded too far, there remained not enough residual flow to secure a smooth surface. If the gelation did not proceed far enough, the flow of the gelled mixture was too great and a surface having the desired depth was frequently not obtained. This meant that highly trained operators were required to perform the process; it meant further that a large number of coatings were made which did not meet the desired specifications. Another disadvantage of such a process is that it is slow and cumbersome because of the necessity of handling the assembly during the gelation step.

Other prior art processes generally paralleled the last method. Always the gelation of the mixture was a critical factor. The criticalness was further enhanced by the facts that the gelling characteristics of the mixture varied with age and also varied from batch to batch of the mixture. This required considerable, continued experimentation in order to determine the proper temperatures and times necessary to attain the critical point of gelation.

It is an advantage of the present method that controlled gelation of the copolymerizable mixture is unnecessary. It is a further advantage that protective surfaces having both depth and beauty may be obtained by easy and simple operations without experiencing a considerable proportion of unacceptable surfaces.

This invention is also to be distinguished from prior art methods which utilize phenol-formaldehyde resins, melamine-formaldehyde resins and the like. In such methods, sheets of fibrous material are impregnated with a resin solution and the resin is advanced by heat to a B stage or intermediate degree of cure. When pressure is applied to these sheets the resin still retains a significant amount of flow and will produce a smooth surface and the coated sheets will bond themselves to the article to be surfaced. In this invention, however, controlled polymerization is completely unnecessary. This consequently eliminates need for laboratory controls and the accompanying expense thereof.

The method of this invention comprises the steps of coating one or both sides of a sheet of fibrous material, for example paper, with a liquid copolymerizable mixture containing an unsaturated alkyd resin and a material having a $CH_2=C<$ grouping and a boiling point of at least 60° C. which is copolymerizable therewith and subsequently curing said mixture to a hard, infusible state upon the paper. The next step comprises forming an assembly containing the article to be surfaced, a layer of adhesive, and the above described sheet of coated fibrous material with the coated side of the sheet away from the article, if only one side of the sheet has been coated. The assembly is completed by placing a top layer of copolymerizable mixture of the above description on the sheet of coated fibrous material. An object having a smooth surface, for example, a metal plate or a sheet of cellophane, is then superimposed on the assembly and the whole is subjected to conditions which will cause the top layer of copolymerizable mixture to cure to a hard infusible copolymer and which will cause the adhesive layer to bond the sheet of coated fibrous material firmly to the article to be surfaced. The superimposed object is then removed from the assembly and the ultimate surface is visible.

It will thus be seen that the surface imparted to the article is comprised of three distinct layers, i. e., a layer of adhesive, the coated fibrous material, and a top surface layer of hard, infusible copolymer. The primary function of the sheet of coated fibrous material is to provide a surface having depth. Since the resinous coating on the fibrous material has been cured prior to assembly to an infusible state the coating retains no residual flow and the entire thickness of the coating becomes a part of the ultimate surface. Since the said resinous material is hard and infusible, the sheet of fibrous material will not bond to the article to be surfaced and thus the use of an adhesive is required. The coated fibrous material, itself, will not provide a smooth and attractive surface and for this reason the top layer of copolymerizable mixture is necessary to secure an acceptable surface. It is a surprising result that the top layer of polymerizable mixture will bond itself firmly during cure to the sheet of coated fibrous material. The explanation of this phenomena is probably that the bond is effective because the copolymer coating on the fibrous material still retains a minute surface layer of incompletely cured copolymer since it has been cured in the presence of air. The inhibiting effect of air on the cure of these compositions has been previously explained. During the pressing of the assembly this top layer of copolymerizable mixture flows evenly and fills in the uneven surface of the coated fibrous material providing a continuous outer film which takes the surface of the object superimposed upon it. Thus the top layer of copolymerizable mixture during cure achieves an outer surface which is a replica of the surface of the superimposed object.

The following examples are given by way of illustration not by way of limitation:

PREPARATION OF COPOLYMERIZABLE MIXTURE A

The following ingredients were placed in a suitable reaction vessel:

6.3 moles diethylene glycol
3.0 moles fumaric acid
3.0 moles phthalic anhydride

The ingredients were esterified by reacting under carbon dioxide for 10 hours at 200° C. The final acid number was 35.

Sixty parts of this unsaturated alkyd resin were blended with forty parts of styrene to produce copolymerizable mixture A, proportions being by weight.

PREPARATION OF COPOLYMERIZABLE MIXTURE B

The following ingredients were placed in a suitable reaction vessel:

6.6 moles ethylene glycol
3.0 moles maleic anhydride
3.0 moles adipic acid

The ingredients were esterified by reacting under carbon dioxide for 6 hours at 160° C. and 20 hours at 200° C. The final acid number was 10.

Eighty parts of this unsaturated alkyd resin were blended with twenty parts of diallyl phthalate to produce copolymerizable mixture B, proportions being by weight.

PREPARATION OF COPOLYMERIZABLE MIXTURE C

The following ingredients were placed in a suitable reactor:

6.0 moles propylene glycol
1.0 moles 2-ethyl hexanol
3.0 moles fumaric acid
3.0 moles tetrachlorophthalic anhydride These ingredients were esterified by reacting under carbon dioxide for 6 hours at 160° C. and 12 hours at 200° C. The final acid number was 50.

Seventy parts of this unsaturated alkyd resin were blended with 30 parts styrene to produce copolymerizable mixture C, proportions being by weight.

*Example 1*

A sheet of loosely woven rayon fiber paper 4 mils in thickness was passed through a dip tank containing polymerizable mixture B catalyzed with 2 percent benzoyl peroxide and thence upward between a bank of infra red lamps wherein the temperature was approximately 150° C. The time of travel between the lamps was adjusted to approximately 5 minutes. On emerging from the heated zone the paper was coated on both sides with a film of hard, infusible copolymer and its thickness was approximately 25 mils. The coated paper was translucent and resembled ordinary wax paper in its feel and appearance.

This sheet of paper bearing a coating of hard infusible copolymer was again passed through the dip tank containing copolymerizable mixture B but this time the mixture was left uncured. The paper now bore an outer coating of a liquid viscous mixture. Thus treated paper was then placed upon a panel of mahogany veneer plywood. A polished stainless steel plate was superimposed on the treated paper and the assembly was placed in a platen press and subjected to a pressure of 5 p. s. i. and a temperature of 160° C. for ten minutes. The assembly was then removed from the press and the polished steel plate was removed from the surface.

The resultant panel of plywood had a surface of hard copolymer approximately 29 mils thick. The surface was highly polished, glossy, extremely attractive, and essentially transparent. No rubbing, polishing or subsequent treatment of any kind was necessary to finish the surface. The finished surface showed no ill effects when left in contact with alcohol, ethyl acetate, water, benzene, coffee and tea solutions, tincture of iodine, and ordinary writing ink for a period of 24 hours. The abrasion resistance and the dimensional stability of the product were excellent.

*Example 2*

A sheet of white pigmented sulfite paper 10 mils thick was coated as described in Example 1 to produce a sheet of paper bearing a coating of hard, infusible copolymer. The coated paper was approximately 35 mils thick. A panel of Masonite board was then coated with a thin film of a liquid, furfural alcohol modified, urea-formaldehyde resin adhesive. The coated paper was then placed on top of the adhesive and a thin film (about 10 grams per square foot) of copolymerizable mixture A was spread on the upper surface of the coated paper. A sheet of cellophane was then superimposed on copolymerizable mixture A and the entire assembly was pressed in a platen press under the same conditions as shown in Example 1. When the assembly was removed from the press and the cellophane stripped from the surface the surface was very similar in appearance to that obtained in Example 1. The surface, of course, because of the presence of pigment in the paper appeared white instead of transparent as in the foregoing example. Drops of alcohol, benzene, coffee solution, water, and tincture of iodine were placed on the surface and the drops were covered with hollow brass caps to prevent evaporation. At the end of 24 hours, the surface was cleaned and it showed no visible spots or stains.

*Example 3*

A sheet of lightweight cotton cloth was knife coated on one side with copolymerizable mixture B catalyzed with 0.5% acetyl peroxide. The thickness of the coating was approximately 6 mils. The cloth was then placed in a steam heated hot air oven maintained at a temperature of 200° C. and the film of copolymerizable mixture was cured to a hard infusible state thereon in a period of 5 minutes. The coated cloth was then passed through a dip tank containing copolymerizable mixture A catalyzed with 3.0% lauroyl peroxide. This coated cloth now bearing an outer coat of liquid copolymerizable mixture was then placed upon a panel of solid walnut with the side containing the coating of solid copolymer away from the wood. An aluminum plate, which had been treated with oleic acid as a parting agent, was then superimposed on the assembly and the assembly was subjected to 100 lbs. pressure at a temperature of 90° C. for a period of 30 minutes. The aluminum plate was then removed and the walnut panel now possessed a surface approximately 12 mils thick. The surface was smooth and had somewhat of a satin appearance since it was a replica of the aluminum plate. This surface, too, was tested with solvents and other liquids and showed excellent resistance thereto.

*Example 4*

A sheet of 4 mil rayon fiber paper was dip coated with polymerizable mixture C catalyzed with 1% tertiary butyl hydroperoxide and the mixture was cured thereon by subjecting the dipped paper to a temperature of 160° C. for three minutes. The coated sheet was approximately 26 mils thick. The coated sheet of paper was then recoated on both sides with polymerizable mixture C containing 0.1% acetyl peroxide. The sheet was then placed upon the outer surface of a semicylindrical shaped panel of walnut veneer plywood. A sheet of cellophane was then superimposed and a pressure of about 5 p. s. i. was applied by stretching the cellophane tightly over the assembly. The polymerizable mixture was then cured in an oven while still under pressure for 13 minutes at 120° C. and the cellophane was then removed. A glossy, smooth, transparent surface had been imparted to the plywood. The surface was resistant to alcohol, benzene and water.

The unsaturated alkyd resin component of the copolymerizable compositions used in carrying the present invention into effect is prepared in accordance with technique now well known to those skilled in the resin art. Such resins are preferably produced by the esterification of an alpha, beta unsaturated polycarboxylic acid, with a polyhydric alcohol, for example, a glycol.

Any alpha, beta unsaturated polycarboxylic acid may be used in preparing the unsaturated alkyd resin. Examples of unsaturated alpha, beta organic acids that may be employed are: maleic, fumaric, itaconic, citraconic, monohalomaleic, monohalo fumaric, mesaconic, aconitic, etc. Anhydrides of these acids may be used when available. The unsaturated carboxylic acid may be replaced in part with an unsaturated monocarboxylic acid, for example, acrylic, methacrylic, cinnamic, etc. Mixtures of unsaturated polycarboxylic acids or mixtures thereof with one or more unsaturated monocarboxylic acids may be used if desired.

Any polyhydric alcohol may be employed, but I prefer to use a glycol. Examples of polyhydric alcohols that may be used in making the unsaturated alkyd resins are ethylene glycol, di-, tri- and tetra- ethylene glycol, propylene glycol, decamethylene glycol, glycerol, pentaerythritol, etc. Mixtures of polyhydric alcohols may be employed, if desired.

In some cases, instead of using an unmodified, unsaturated alkyd resin, I may use a polymerizable unsaturated alkyd resin which has been internally modified by replacing a part, for example, about 75 mol per cent, of the unsaturated polycarboxylic acid with a non-ethylenic polycarboxylic acid, for example, a saturated aliphatic polycarboxylic acid including succinic, adipic, glutaric, pimelic, azelaic, citric acids, etc., or a cyclic polycarboxylic acid such as cyclohexane dicarboxylic acids, etc., or an aromatic polycarboxylic acid, e. g., phthalic, terephthalic, chlorinated phthalic acid or anhydride, etc.

Various mono-esterifiable compounds also may be incorporated into the unmodified unsaturated alkyl resin or into such a resin which has been modified as above described. Thus, in producing the copolymerizable compositions used in practicing the present invention, I may employ an unsaturated alkyd resin which has been modified by incorporating therein a saturated or unsaturated normal or isomeric monohydric alcohol or mixtures thereof, a saturated or unsaturated monocarboxylic acid or mixtures thereof, or both such monocarboxylic and monohydroxy organic compounds.

The aforesaid modifiers which are mono-esterifiable componds may be introduced into the esterification product before, during or after the esterification of the polyhydric alcohol with the unsaturated polybasic acid, under conditions such that the inter-esterification of the mono-esterifiable compound with the incompletely esterified polyhydric alcohol-polybasic acid reaction product is obtained.

The unsaturated alkyd resin component of the polymerizable composition is preferably one having an acid number not greater than 50, although in some cases, resins having an acid number as high as 100 may be desirable. Generally, the acid number should be as low as possible but this is sometimes influenced by practical considerations such as time, temperature and economy. The relative proportion of the hydroxyl compounds and the carboxyl compounds used in preparing the unsaturated alkyd resins is generally adjusted to give a ratio of about 1 hydroxyl group to each carboxyl group although it is normally preferable to employ a slight excess of hydroxyl groups, that is an excess up to about 20%.

The term "unsaturated alkyd resin" as used herein and in the appended claims does not include within its meaning the conventional drying oil modified alkyd resins in the preparation of which an aromatic or saturated aliphatic polycarboxylic acid or anhydride is employed. The term "acid" and more specifically "poly-carboxylic acid" as used herein and in certain of the appended claims includes within its meaning the anhydride thereof if available.

The monomeric material which is copolymerized with the unsaturated alkyd resin or resins is preferably one which contains a $CH_2=C<$ grouping, has a boiling point of at least about 60° C., and no conjugated carbon to carbon double bonds. Allyl compounds, that is, compounds containing one or more $CH_2=CH—CH_2$ groupings, especially those which boil above 60 degrees C. are especially suitable for use. Examples of monomeric materials which may be copolymerized with the unsaturated alkyd resin are the unsaturated alcohol esters, e. g. the allyl, methallyl, crotyl, cinnamyl, vinyl, etc., esters of saturated and unsaturated aliphatic and aromatic mono-basic and polybasic acids, such, for instance, as acetic, propionic, caproic, acrylic, crotonic, oxalic, succinic, sebacic, adipic, maleic, fumaric, etc.; the saturated monohydric alcohol esters, for example, the methyl, ethyl, propyl, butyl, etc., esters of the unsaturated aliphatic mono-basic and polybasic acids, illustrative examples of which appear above, vinyl cyclic compounds, styrene, chlorostyrene, methyl-styrenes, divinyl benzene, etc.

Allyl compounds, more particularly, the allyl esters are especially suitable for use with the unsaturated alkyd resin in preparing the copolymerizable composition. Examples of such esters are allyl acrylate, diallyl-carbonate, diallyl fumarate, diallyl-phthalate, diallyl succinate, diallyl adipate, etc. Mixtures of monomeric materials may be copolymerized with one or more saturated alkyd resins if desired.

The polymerization of the copolymerizable mixture is preferably accelerated by incorporating a polymerization catalyst therein. The polymerization catalysts include the organic superoxides, alcoholic and acidic peroxides. Among the preferred catalysts are benzoyl peroxide, acetyl peroxide, lauroyl peroxide, tertiary butyl perbenzoate, tertiary butyl hydroperoxide, etc. Still other polymerization catalysts may be used in some cases, e. g., stannic chloride and paratoluene sulfonic acid. It is also possible to employ actuators or promotors along with the peroxide catalyst. Examples of such promoters are N,N diethyl aniline, lauryl mercaptan, cobalt naphthenate, etc.

The concentration of the catalyst employed is usually small, that is, for the preferred catalysts from, by weight, about one part catalyst per thousand parts of the mixture to be polymerized, to about three parts catalyst per 100 parts of the said mixture. If an inhibitor be present, up to 5 per cent or even more by weight of catalyst, based on the weight of the polymerizable composition, may be necessary according to the concentration of the inhibitor.

The conditions normally used in polymerization are heat, light or a combination of both. Ultraviolet light is more effective than ordinary light. The temperature of conversion depends somewhat on the boiling point of the monomeric material which is copolymerized with the unsaturated alkyd resin. In most cases, the temperature of copolymerization will be within the range of 40° C. to 200° C., usually within the range of 60° C. to 150° C., depending upon the particular mixtures of copolymerizable materials employed, the particular catalyst, if any, used, the rapidity of copolymerization wanted, and other influencing factors.

The proportions of unsaturated alkyd resin and other monomeric material which is copolymerized therewith may be varied as desired or as conditions may require, but ordinarily the proportions thereof in the polymerizable mixture will be within the range of, by weight, from about 20 to about 80 percent of the former to about 80 to 20 percent of the latter.

In some cases, it is desirable that a polymerization inhibitor be incorporated into the copolymerizable composition comprising a mixture of monomeric or partially polymerizable materials, since they will frequently polymerize even at room temperature within a comparatively short time. Examples of inhibitors that may be used are hydroquinone, benzaldehyde, resorcinol, etc.

The concentration of the inhibitor is preferably low and less than about 1 percent by weight of the polymerizable mixture is usually sufficient. Generally, however, I prefer to use about 0.01 to 0.1 percent, by weight, thereof, based on the weight of the polymerizable mixture.

A more detailed description of the copolymerizable mixtures used in the present invention may be found in U. S. Patents Nos. 2,409,633, and 2,443,735 through 2,443,741.

The copolymers resulting from the cure of these copolymerizable mixtures may be made with a variety of physical properties. Depending on the ingredients from which the alkyd resin is formed and on the selection of the reactive material having a $CH_2=C<$ grouping, the copolymer may be either flexible or brittle. Thus the coated fibrous material can be provided with a coating of flexible copolymer and the top layer of copolymerizable mixture can be chosen to provide a hard and brittle copolymer. The resulting surface will then be a hard, brittle copolymer on a base of softer, flexible copolymer. The advantages of such a surface are apparent.

The particular articles which may be surfaced according to the present invention are of wide variation. The method is particularly adaptable to flat articles such as wood, plywood, pressed board and the like. However, the surfacing of curved articles is also within the scope of the invention. It is a limiting factor that the top layer of copolymerizable mixture be cured out of contact with air and, hence, an object must be superimposed on the layer of polymerizable mixture. This means that the superimposed object must also conform to the shape of the article to be surfaced. This is relatively simple when a sheet of cellophane is used as the superimposed object but if metal is used, the necessity for a metal mold conforming to the shape of the article is apparent.

The term "pressed board" as used herein is intended to include board-like articles composed of fibrous material, in sheet or discrete form, bonded together with a natural or synthetic resinous substance. In this category are included resin-bonded laminates and the construction material known as Masonite.

The fibrous material used in practicing this invention may be any fibrous material in sheet form. It has been found that paper and cloth made from rayon, silk, asbestos, glass, or wood, cotton and other cellulosic fibers are suitable fibrous materials for practicing this invention. In many cases a transparent surface will be desired. In this latter case it is advisable to use paper. In particular it has been found that, if a paper composed of loosely assembled rayon fibers is employed, an essentially transparent coating will be obtained. In other instances, when other types of paper or cloth are employed the coating will vary from translucency to opacity depending upon the particular type of fibrous material used. It is also within the scope of this invention to use paper or cloth which is pigmented or decorated. In this manner it is possible to obtain coatings which are colored or which show a particular design or decoration. The presence of the fibrous material in the ultimate surface is actually an advantage because the fibrous material serves as a reinforcement for the resinous material and thus the dimensional stability of the surface is improved over surfaces which contain no fibrous material.

Any convenient method may be used for coating the fibrous material with the copolymerizable mixture and subsequently curing the mixture thereon. One convenient method of performing this operation comprises passing the sheets of fibrous material through a bath of the liquid copolymerizable, catalyzed mixture and then passing the coated fibrous material through a heated zone whereby the mixture is copolymerized to the solid infusible state. Another convenient method comprises knife coating the sheet of fibrous material and subsequently applying heat in any manner to cure the mixture thereon. As sources of heat it is possible to use, for example, infra red lamps or steam heated ovens. Using these means it is possible to obtain a coating of almost any desired thickness. Usually the coating will vary from 1 to 50 mils in thickness although the preferred thickness of the coating is between 5 and 25 mils.

The adhesive which is used to bond the coated paper to the object to be surfaced may be selected from a wide variety of resinous or non-resinous materials. Materials which have been found suitable include urea-formaldehyde resins, melamine-urea formaldehyde resins, phenol formaldehyde resins, and thermoplastic materials such as cellulose acetate, nitrocellulose, etc. A preferred adhesive is a composition comprising a mixture of an unsaturated alkyd resin and a material having a $CH_2=C<$ grouping which is copolymerizable therewith; i. e., a composition from the same class of synthetic resins which has been used to coat the fibrous material and is also used as the topmost layer of the ultimate coating. This last mentioned composition is particularly adapted to those instances where a transparent coating is desired. It is within the scope of the invention, however, that any adhesive substance capable of bonding the coated paper to the article to be surfaced may be used. It is preferred, however, to use thermosetting adhesives for the reason that heat is normally used to cure the assembly and no subsequent cooling step is necessary with thermosetting adhesives prior to removal of the pressure. The heat can thus be used to cure both the top layer of unpolymerized mixture and the layer of adhesive substance.

The top layer of copolymerizable mixture is always selected from the type mixture hereinbefore described. It may be applied to the previously coated fibrous material or it may be applied to the superimposed object. In either case it serves the function of flowing under pressure and filling in irregularities and unevenness in the coated fibrous sheet and it provides a continuous outer film of copolymer over the coated fibrous sheet. It may be applied in almost any quantity ranging from spreads of 2 grams per square foot to 50 grams per square foot but a preferred spread is from 10 to 30 grams per square foot.

The object which is superimposed on the top layer of copolymerizable mixture can be composed of any material which will not inhibit the cure of the copolymerizable mixture nor adhere to it after the cure. Examples of materials which have been found suitable are aluminum, plateglass, steel, and cellophane. It may be necessary in some cases to apply a thin film of parting agent to the object in order to facilitate its later separation from the copolymer. Examples of parting agents are higher fatty acids, silicone grease, and polyvinyl alcohol. In the case of cellophane a parting agent is seldom required since cellophane will part easily from the cured composition. It is a further preferment that the object have a smooth non-porous surface since this will prevent its adhering to the resinous surface and since the surface of the object will be imparted directly to the copolymerizable mixture as it cures. Thus if the object has a polished, glossy surface, the copolymer surface will also be polished and glossy. Similarly, a satin finish on the superimposed object will impart a satin finish to the copolymer.

After the assembly has been formed and the object has been superimposed it is preferred to use a slight pressure in order to assure even contact between the superimposed object and the top layer of copolymerizable mixture. Pressures varying from 5 p. s. i. to several hundred p. s. i. may be used but the preferred range is from 5 to 100 p. s. i. Using a proper selection of catalysts the top layer of copolymerizable mixture can be made to eventually cure at room temperature. However, because of the practical consideration of time, it is preferred to heat the assembly at temperatures ranging between 60° C. and 150° C. for periods varying from 5 minutes to 1 hour. The nature of the adhesive used will also have an influence on the selection of the proper pressure and temperature but, when the adhesive is of the same nature as the top layer of copolymerizable mixture, the conditions specified above are adequate.

I claim:

1. A method of surfacing articles which comprises forming an assembly comprising (1) the article, (2) a layer of an adhesive, (3) a sheet of fibrous material bearing a coating of a solid, cured, infusible copolymer, said copolymer having been prepared by the copolymerization of a copolymerizable mixture containing an unsaturated alkyd resin and a material, said material having a $CH_2=C<$ grouping and a boiling point of at least 60° C. and being copolymerizable with the alkyd resin and (4) a layer of said copolymerizable mixture in an uncured state, superimposing an object having a smooth surface upon said layer, (4) and subjecting the assembly to heat and pressure whereby the copolymerizable mixture of said layer (4) is cured to a hard, infusible state, and subsequently removing the superimposed object.

2. A method according to claim 1 in which the adhesive is a copolymerizable mixture containing an unsaturated alkyd resin and a material, said material having a $CH_2=C<$ grouping and a boiling point of at least 60° C. and being copolymerizable with the alkyd resin.

3. A method according to claim 1 in which the article is plywood.

4. A method according to claim 1 in which the article is pressed board.

5. A method of surfacing articles which comprises the steps of coating a sheet of fibrous material with a liquid copolymerizable mixture containing an unsaturated alkyd resin and a material, said material having a $CH_2=C<$ grouping and a boiling point of at least 60° C. and being copolymerizable with the alkyd resin, converting said polymerizable mixture to a hard infusible copolymer by the application of heat, recoating said sheet of fibrous material with a polymerizable mixture as defined above, placing said recoated sheet of fibrous material upon the article to be surfaced, superimposing a metal object conforming to the shape of the article, subjecting the whole to heat and pressure and subsequently removing the metal object.

6. A method of surfacing articles which comprises the steps of coating a sheet of fibrous material with a liquid copolymerizable mixture containing an unsaturated alkyd resin and a material, said material having a $CH_2=C<$ grouping and a boiling point of at least 60° C. and being copolymerizable with the alkyd resin, converting said copolymerizable mixture to a hard infusible copolymer by the application of heat, applying a layer of an adhesive to the article to be surfaced, placing the coated sheet of fibrous material upon the adhesive layer, placing a layer of copolymerizable mixture as defined above upon the coated sheet of fibrous material, facing the layer of copolymerizable mixture with an object having a smooth, nonporous surface, and subjecting the whole to heat and pressure and subsequently removing said object.

7. A method according to claim 6 in which the adhesive is a copolymerizable mixture containing an unsaturated alkyd resin and a material, said material having a $CH_2=C<$ grouping and a boiling point of at least 60° C. and being copolymerizable with the alkyd resin.

8. A method according to claim 6 in which the fibrous material is paper.

9. A method according to claim 6 in which the article is plywood.

10. A method according to claim 6 in which the article is pressed board.

11. A method according to claim 6 in which the material having a $CH_2=C<$ grouping is styrene.

12. A method according to claim 6 in which the material having a $CH_2=C<$ grouping is diallyl phthalate.

EDWIN H. DAFTER, Jr.

REFERENCES CITED

The following references are of record in the file of this patent:

UNITED STATES PATENTS

| Number | Name | Date |
| --- | --- | --- |
| 1,454,845 | Clay | May 15, 1923 |
| 1,597,539 | Novotny et al. | Aug. 24, 1926 |
| 1,697,182 | Hall et al. | Jan. 1, 1929 |
| 2,084,081 | Faber | June 15, 1937 |
| 2,343,740 | Birmingham | Mar. 7, 1944 |
| 2,409,633 | Kropa | Oct. 22, 1946 |
| 2,443,741 | Kropa | June 22, 1948 |
| 2,496,122 | Donahue | Jan. 31, 1950 |
| 2,497,712 | Auchter | Feb. 14, 1950 |
| 2,562,641 | Saunders | July 31, 1951 |